(12) United States Patent
Wong et al.

(10) Patent No.: US 12,503,282 B2
(45) Date of Patent: Dec. 23, 2025

(54) LID ASSEMBLIES FOR CONTAINERS

(71) Applicant: AEGIS GLOBAL RESOURCES (HK) LIMITED, Hong Kong (CN)

(72) Inventors: Siu Wah Wong, Hong Kong (CN); Fat Sun Kwok, Hong Kong (CN); Chi Yeung Chan, Hong Kong (CN); Shun Sang Poon, Hong Kong (CN)

(73) Assignee: AEGIS GLOBAL RESOURCES (HK) LIMITED, Hong Kong (CN)

( * ) Notice: Subject to any disclaimer, the term of this patent is extended or adjusted under 35 U.S.C. 154(b) by 183 days.

(21) Appl. No.: 18/287,535

(22) PCT Filed: Sep. 14, 2022

(86) PCT No.: PCT/IB2022/058654
§ 371 (c)(1),
(2) Date: Oct. 19, 2023

(87) PCT Pub. No.: WO2023/042087
PCT Pub. Date: Mar. 23, 2023

(65) Prior Publication Data
US 2024/0182213 A1    Jun. 6, 2024

Related U.S. Application Data

(60) Provisional application No. 63/243,962, filed on Sep. 14, 2021.

(51) Int. Cl.
*B65D 47/20* (2006.01)
*A47G 19/22* (2006.01)
(Continued)

(52) U.S. Cl.
CPC ..... *B65D 47/2031* (2013.01); *A47G 19/2272* (2013.01); *A47G 21/18* (2013.01);
(Continued)

(58) Field of Classification Search
CPC  B65D 47/2043; B65D 47/32; B65D 2205/00; B65D 77/283; B65D 2231/022; A47G 19/2272; A47G 21/18
See application file for complete search history.

(56) References Cited

U.S. PATENT DOCUMENTS 8,186,537 B2 * 5/2012 Rosnak ................. B65D 47/06
                                                        220/709
9,314,120 B2 * 4/2016 Kemper ............. A47G 19/2266
(Continued)

FOREIGN PATENT DOCUMENTS

JP          2020179886 A  * 11/2020

*Primary Examiner* — Don M Anderson
*Assistant Examiner* — Jennifer Castriotta
(74) *Attorney, Agent, or Firm* — WPAT, PC

(57) ABSTRACT

A lid unit for use with a beverage container. The lid unit includes a lid body having a lid cover and a side wall extending downwardly from the lid cover; and a drink straw having a gas relief valve detachably fitted to the lid body. In particular, a rotatable top plate can be placed on the lid cover; and the gas relief valve can permit the pressured gas to escape the lid unit. The gas relief valve can include a valve body, flexible strip and spool. Also, the lid cover has an annular raised rim, and defines two drink orifices. The first drink orifice is shaped and sized to be an elongated slot, and the second drink orifice is shaped and sized to be a circular hole for insertion of the drink straw. The two drink orifices are spaced apart circumferentially and in fluid communication with the beverage container.

19 Claims, 5 Drawing Sheets

(51) Int. Cl.
*A47G 21/18* (2006.01)
*B65D 47/32* (2006.01)
*B65D 77/28* (2006.01)

(52) U.S. Cl.
CPC ......... *B65D 47/2043* (2013.01); *B65D 47/32* (2013.01); *B65D 77/283* (2013.01); *B65D 2205/00* (2013.01); *B65D 2231/022* (2013.01)

(56) References Cited

U.S. PATENT DOCUMENTS

| | | | |
|---|---|---|---|
| 11,577,892 B2* | 2/2023 | Wong | B65D 47/061 |
| 2014/0069944 A1* | 3/2014 | Shapiro | A61J 9/006 |
| | | | 220/709 |

* cited by examiner

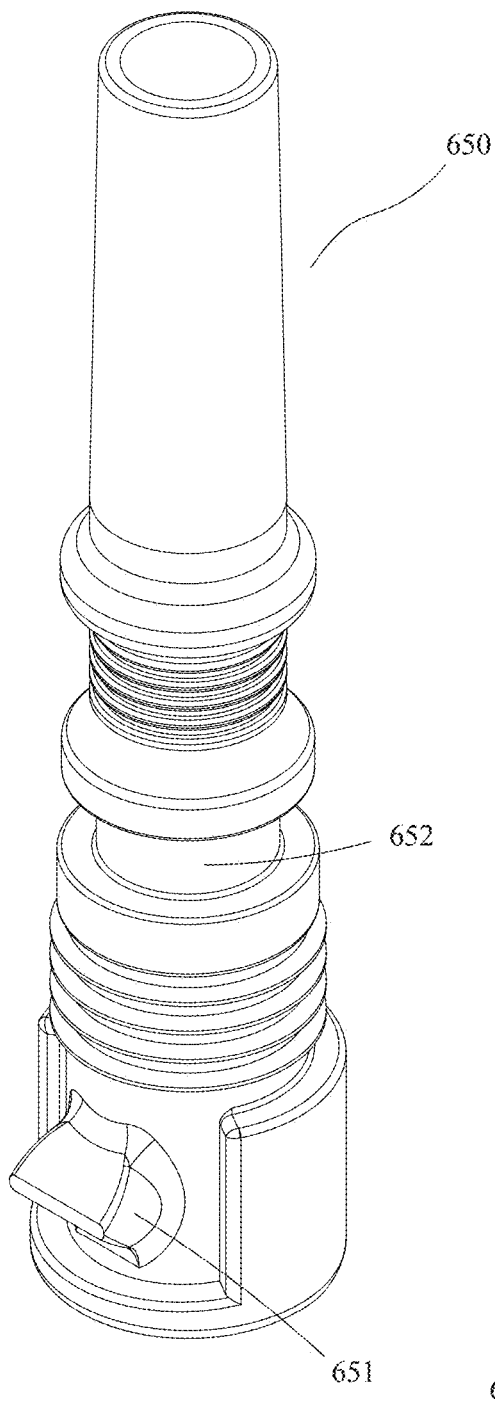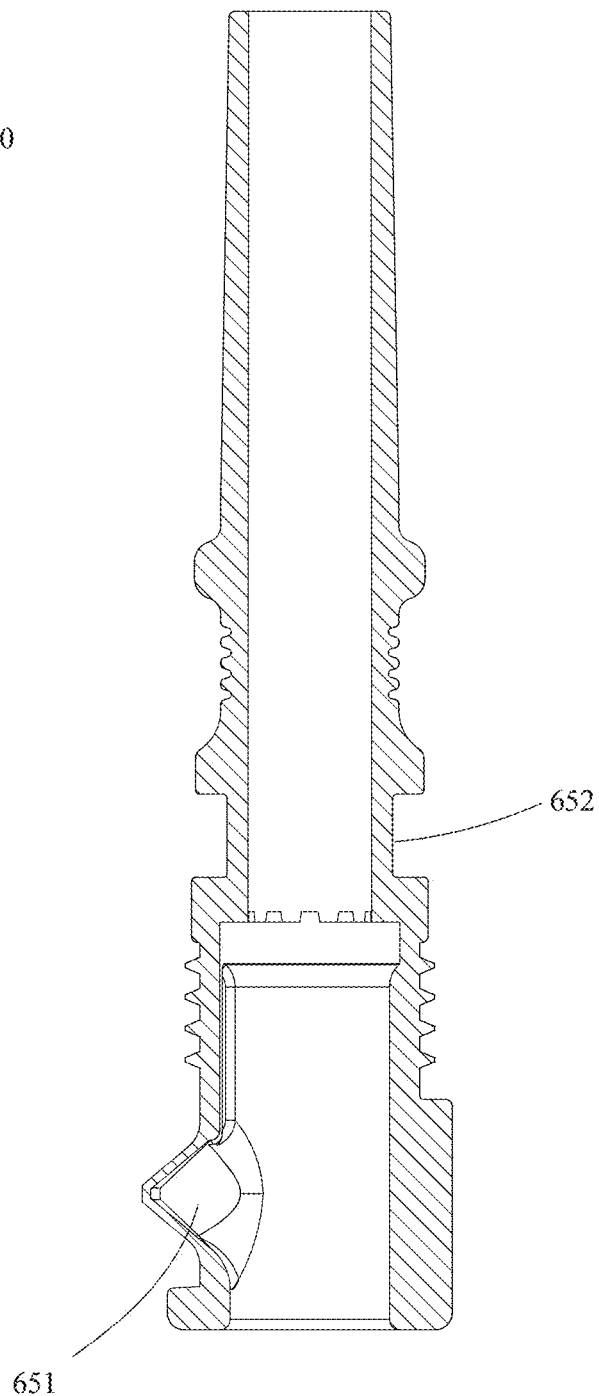
Fig. 4A                    Fig. 4B

LID ASSEMBLIES FOR CONTAINERS

FIELD

The present disclosure relates generally to the field of lids for containers, and more particularly, to various lid units or assemblies with improved structures and functions as well as to beverage containers comprising such lid units or assemblies.

BACKGROUND

Beverage containers, from which a beverage can be consumed, are frequently used in combination with a conventional drink straw. However, such beverage container having the conventional drink straw may come with an issue, that is, it is likely that the beverage contained in the container may flow out of the conventional drink straw due to the internal pressure of the container. For examples, in some cases where the beverage container contains hot drinks in closed state, internal pressure is increased, and when the lid assembly is opened, the imbalance of pressure between the interior and the exterior of the beverage container would create a risk that beverage could be inadvertently splashed or spilled out through the conventional drink straw if the internal pressure of the container is increased. The spilling and splashing can create dangerous situations. The term "spilling" as generally used herein refers to flowing of a beverage out of the drink straw; and the term "splashing" as generally used herein refers to the ejection or scattering from the drink straw.

SUMMARY

In order to solve the above-mentioned problems in the conventional drink draw used in the beverage container, an object of the present disclosure is to provide a drink straw that is able to overcome issues such as spilling and splashing in the conventional drink draw. Specifically, the drink straw is provided with an air valve for releasing the air within the drink straw when necessary, in order to balance the pressure inside and outside the drink straw.

In the exemplary embodiments to achieve the above-mentioned aspect, a lid unit for covering a beverage container is presented. The lid unit includes a lid body having a lid cover and a side wall extending downwardly from the lid cover; a top plate, preferably rotatable, mounted on the lid cover; and a drink straw having a gas relief valve detachably fitted to the lid body.

The gas relief valve in the first exemplary embodiment is a one-way valve for releasing the gas inside the drink straw into the lid body, and arranged beneath the second drink orifice within the lid body. When the gas pressure inside the drink straw increases, the gas relief valve opens to permit the pressured gas to pass and escape.

In a second exemplary embodiment, the gas relief valve is in the form of a valve body, a flexible strip and a spool. Specifically, the spool is arranged at an angle relative to the valve body at an angle of between 45° to 90°, and the valve body is firmly sleeved onto an outer surface of the spool by bending the flexible strip, which has a first end fixed to the drink straw, and a second end opposite to the first end, thereby allowing the valve body to be arranged at the second end of the flexible strip.

In both first and second embodiments, the lid cover has an annular raised rim, and defines a central through hole, a first drink orifice, and a second drink orifice. The first drink orifice is shaped and sized to be an elongated slot, and the second drink orifice is shaped and sized to be a circular hole for insertion of the drink straw, with the first and second drink orifices spaced apart circumferentially and in fluid communication with the beverage container.

A top surface of the lid cover includes a recessed portion contiguous to the second drink orifice, and the recessed portion is sized and shaped for accommodating completely a top section of the drinking straw that protrudes beyond the second drink orifice when the top section is folded downward to the lid cover. Also, the first drink orifice and the second drink orifice are sequentially opened by turning the top plate, allowing for selective dispensing of a beverage from the first drink orifice or the second drink orifice. Specifically, the gas relief valve is arranged beneath the second drink orifice inside the lid body to permit pressured gas to pass through the gas relief valve when gas pressure inside the drink straw increases.

When the second drink orifice is in a fully open position, the second drink orifice is fully exposed, and the drink straw elastically folds upward to an upstanding position to be in fluid communication with a beverage in the beverage container to allow for dispensing of the beverage therethrough.

The drink straw has a reduced diameter portion engaged with a protruding portion formed on the inner wall surface of the second drink orifice for mounting the drink straw onto the lid body. When the second drink orifice is in a fully closed position, the top section of the drinking straw is folded down to lie within the recessed portion by running through and protruding beyond the second drink orifice.

A handle is projected from an upper surface of the rotatable top plate, which has a V-shaped cutout. By placing the rotatable top plate on the lid cover, the handle of the rotatable top plate can be rotatably fitted onto a raised rim of the lid cover.

DRAWINGS

The advantages of the present disclosure will become more readily apparent to the ordinarily skilled in the art after reviewing the following detailed description and accompanying drawings, in which:

FIG. 4A is a perspective view of the first drink draw according to the first exemplary embodiment of the present disclosure;

FIG. 4B is a cross-sectional view of the first drink draw according to the first exemplary embodiment of the present disclosure;

DETAILED DESCRIPTION OF EXEMPLARY EMBODIMENTS

Figure 1A:
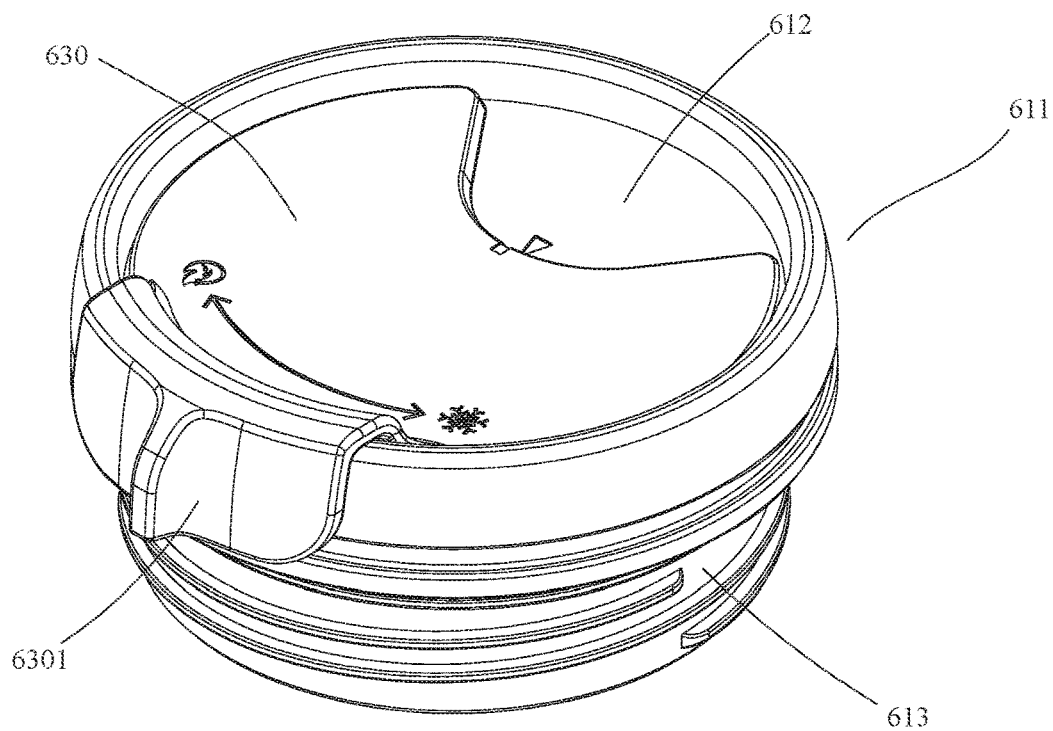
FIG. 1A is a perspective view of a lid assembly according to a first exemplary embodiment of the present disclosure.

Exemplary embodiments of a lid unit or assembly for a beverage container will be described in detail below with references to the accompanying drawings. It should be understood that the dimensions of the various portions in the drawings are not depicted to scale and are for illustrative purposes only and do not represent the true dimensions of the product of the present disclosure. Also, like reference numbers in the various figures of the drawings are used to designate like parts, and that the drilling system of the disclosure may be produced in many different configurations, sizes, forms and materials.

Figure 1B:
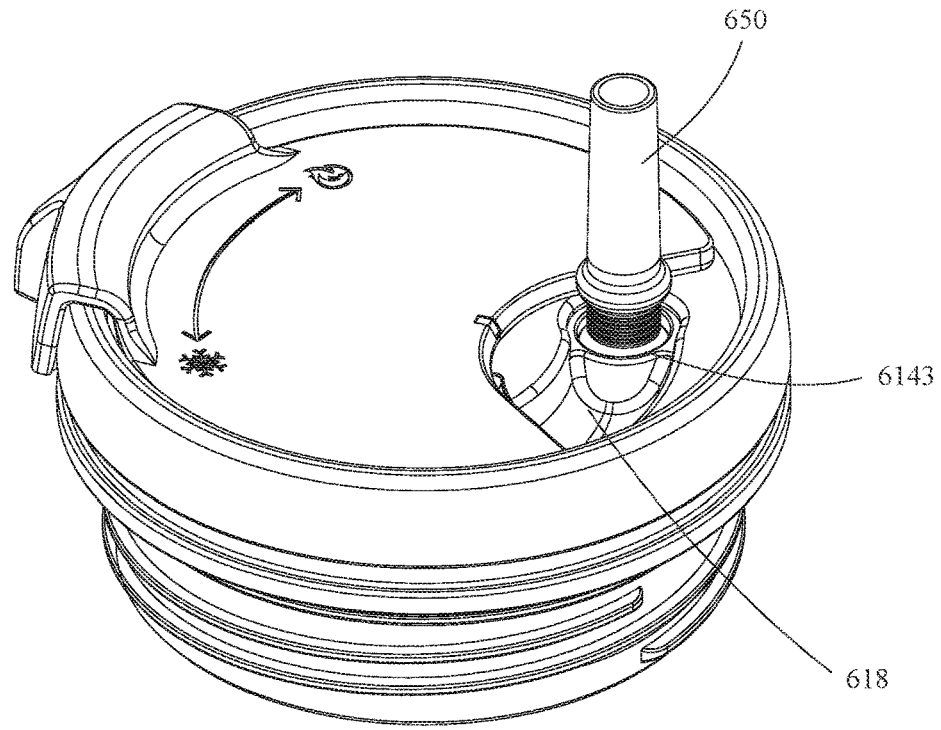
FIG. 1B is a perspective view of the lid assembly of the lid assembly of FIG. 1A inserted with a first drink straw according to the first exemplary embodiment of the present disclosure.
Figure 2A:
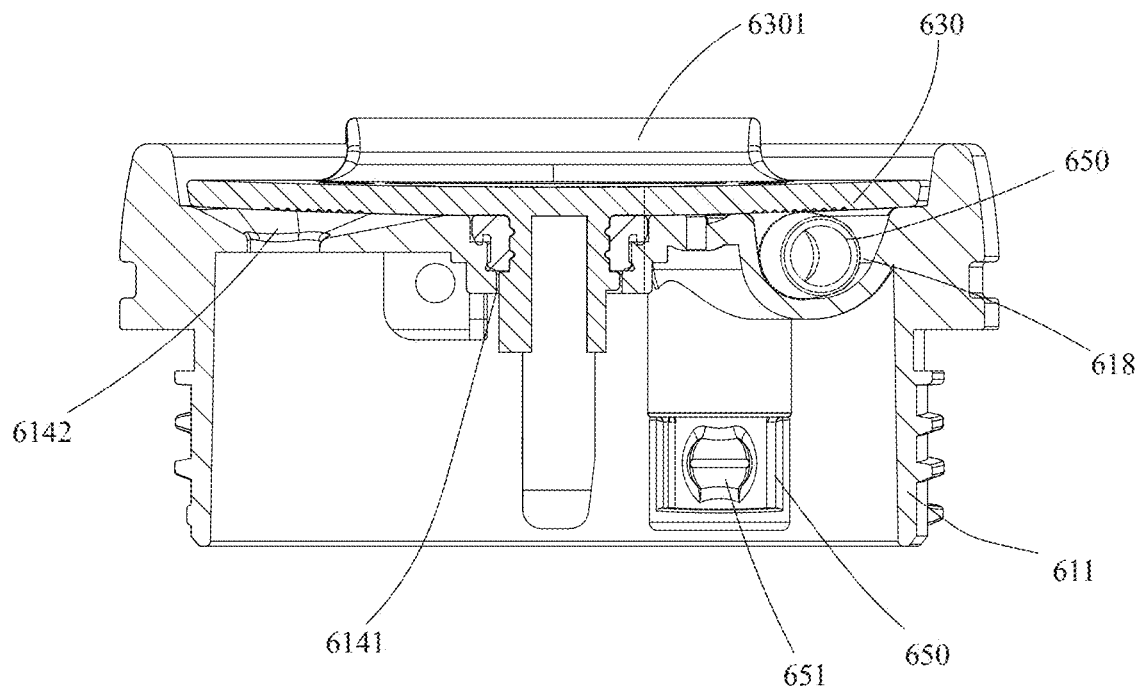
FIG. 2A is a cross-sectional view of the lid assembly as shown in FIG. 1A.
Figure 2B:
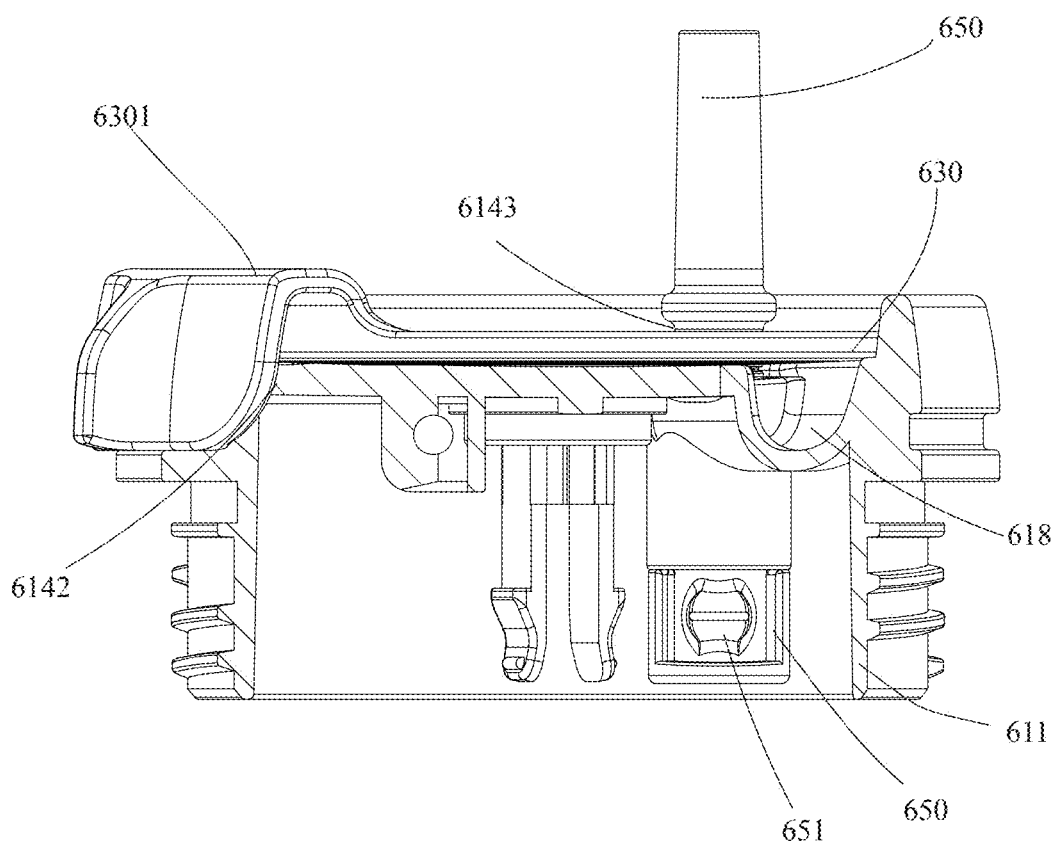
FIG. 2B is a cross-sectional view of the lid assembly as shown in FIG. 1B.

FIGS. 1A and 1B are perspective views of an exemplary lid assembly constructed according to a first embodiment of the present disclosure, and adapted for a travel beverage mug (not shown), with the drinking straw in folded position for stowage (FIG. 1A) and with the drink straw ready for dispensing of beverage (FIG. 1B). FIGS. 2A and 2B are cross-sectional views of the lid assembly in correspondence to the lid assembly shown in FIGS. 1A and 1B, respectively.

For the simplicity and illustrative purposes, other parts of the lid assembly are removed, and the drink straw may be used in any possible forms of lids and drinking cups, coffee cups, and other types of drinking vessels and containers.

The lid assembly may be engaged with the beverage mug through thread mating or in snap-fit manner. As illustrated, the lid assembly comprises a lid body 611, a rotatable top plate 630, and a drink straw 650.

The lid body 611 has a lid cover 612 and a side wall 613 extending downwardly from the lid cover 612. The lid cover 612 may define two or more orifices which may have a same or different size from one another. The side wall 613 is adapted to be coupled to the beverage mug, for example through threading engagement. As illustrated, the lid body 611 is substantially cylindrical. The lid body 611 is sized and configured to secure the lid assembly to an opening of the beverage mug, and can be detachably secured on the top of the beverage mug.

The lid cover 612 has an annular raised rim and defines a central through hole 6141, a first drink orifice 6142, a second drink orifice 6143. The first drink orifice 6142 and the second drink orifice 6143 are of different dimensions and shapes to cater for different beverage consumption needs. For example, the first drink orifice 6142 is shaped and sized to be an elongated slot for direct consumption of the beverage by the user, whereas the second drink orifice 6143 is shaped and sized to be a circular hole for insertion of the drink straw 650. The first drink orifice 6142 and the second drink orifice 6143 are spaced apart circumferentially and may be positioned adjacent to the raised rim of the lid cover 612 and in fluid communication with the interior of the beverage mug.

The rotatable top plate 630 is configured to have a substantially V-shaped cutout and a handle 6301 projecting from an upper surface of the top plate 630. The top plate 630 is placed on the lid cover 612 with the handle 6301 rotatably fitted onto the raised rim of the lid cover 612.

The top surface of the lid cover 612 includes a recessed portion 618 contiguous to the second drink orifice 6143, and the recessed portion 618 is sized and shaped for accommodating completely a top section of the drinking straw 650 that protrudes beyond the second drink orifice 6143, when the top section is folded downward to the lid cover 612. The first drink orifice 6142 and the second drink orifice 6143 are sequentially opened by turning the top plate 630, allowing for selective dispensing of the beverage from the first drink orifice 6142 or the second drink orifice 6143.

When the second drink orifice 6143 is in the fully closed position, the top section of the drinking straw 650 running through and protruding beyond the second drink orifice 6143 is folded down to lie within the recessed portion 618 (see FIG. 2A). When the second drink orifice 6143 is in the fully open position, the second drink orifice 6143 is fully exposed, and the drink straw 650 elastically folds upward to an upstanding position to be in fluid communication with the beverage in the mug to allow for dispensing of the beverage therethrough (see FIG. 2B).

Figure 3:
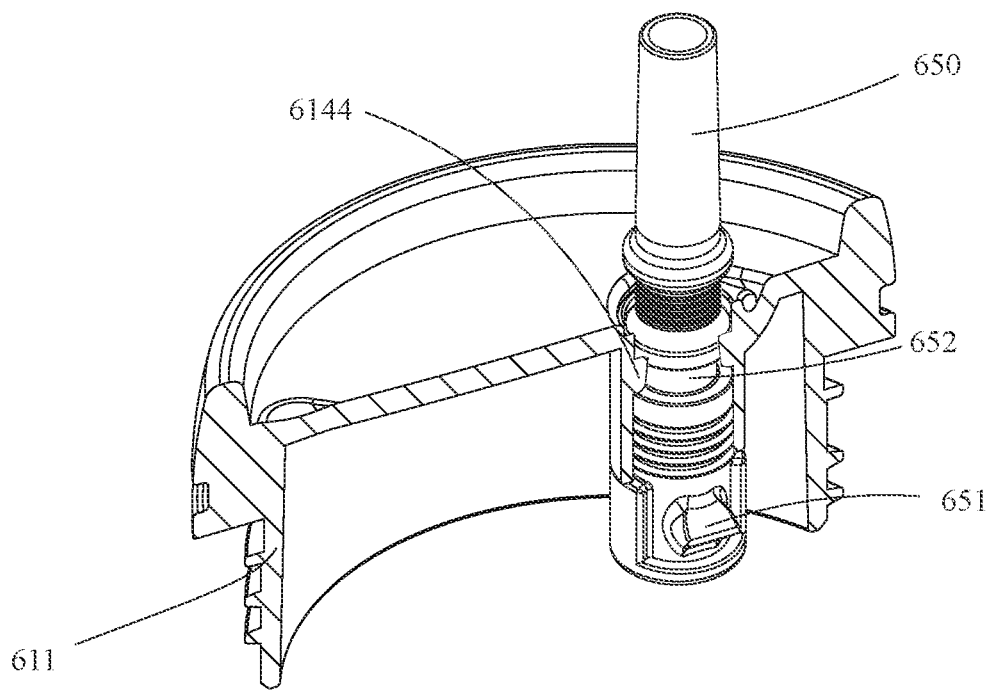
FIG. 3 is a perspective cross-sectional view of the lid assembly inserted with the first drink straw according to the first exemplary embodiment of the present disclosure.

An innovative feature of the drink straw 650 is to incorporate a gas relief valve 651 therein. The gas relief valve 651 is a one-way valve, such as an umbrella valve or a duckbill valve, for releasing the gas inside the drink straw into the lid body. The released gas may escape through a gas vent (not shown) designed in the lid body into the external environment. FIG. 3 is a perspective view of the lid body in cross section with the drink straw 650, and FIGS. 4A and 4B are perspective view and cross-sectional view of the drink straw 650 respectively.

The drink straw 650 has a reduced diameter portion 652 that can engage with a protruding portion 6144 formed on the inner wall surface of the second drink orifice 6143 for mounting the drink straw 650 onto the lid body (see FIG. 3). The valve 651 is arranged beneath the second drink orifice 6143 inside the lid body. When the gas pressure inside the drink straw 650 increases, a hole in the valve 651 permits the pressured gas to pass and escape. In this way, the splash or spill of beverage through the drink straw 650 is prevented.

Figures 5A, 5B:
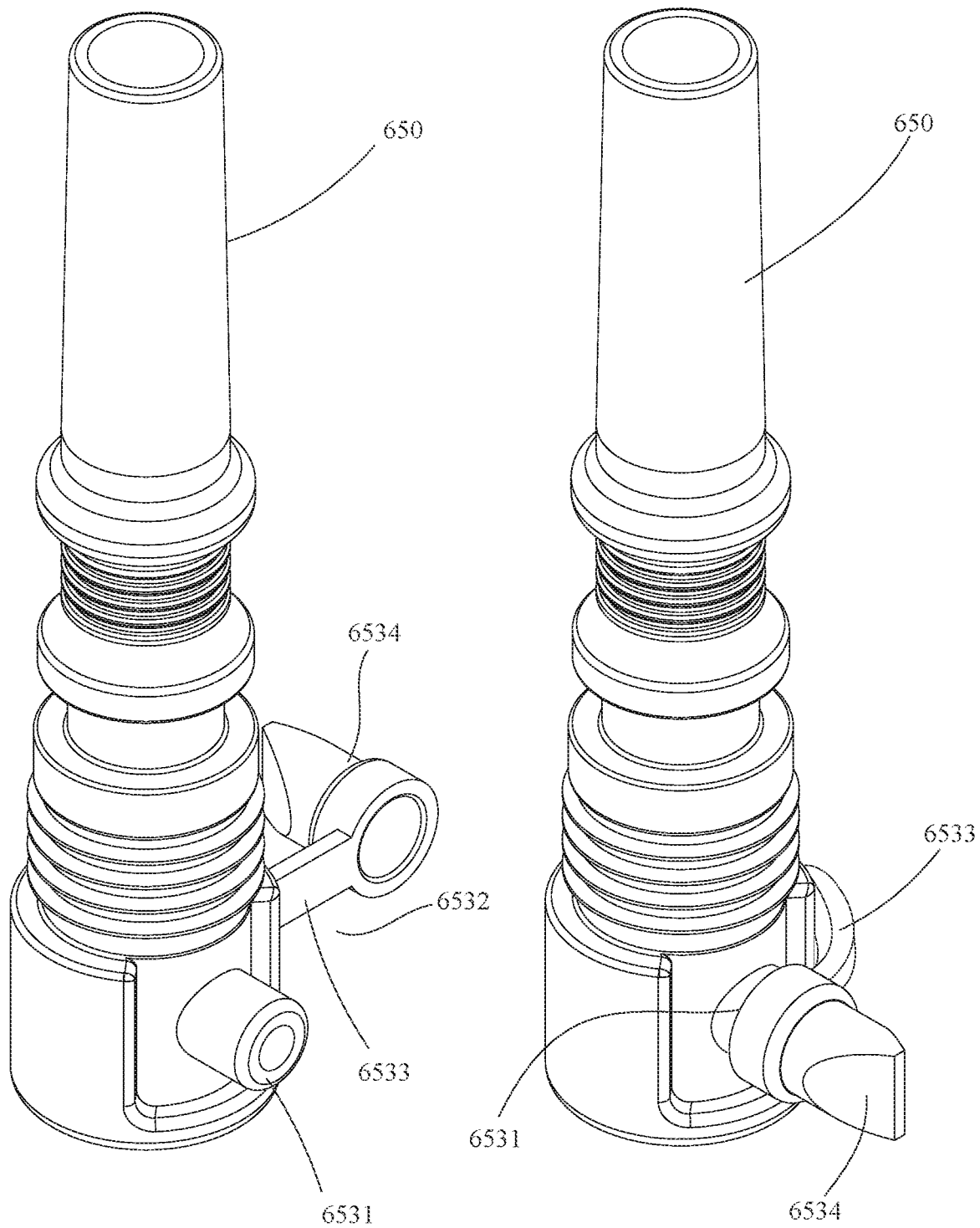
FIG. 5A is a perspective view of a second drink straw in an open valve body position according to a second exemplary embodiment of the present disclosure.
FIG. 5B is a perspective view of the second drink straw in a closed valve body position according to the second exemplary embodiment of the present disclosure.

Another exemplary valve designed for the drink straw 650 is a valve unit illustrated in FIGS. 5A and 5B. In this second embodiment, the valve unit has a spool 6531 formed on the drink straw 650 and a valve unit 6532 having a flexible strip 6533 having a first end fixed to the drink straw 650, a second end opposite to the first end, and a valve body 6534 arranged at the second end of the flexible strip 6533. The spool 6531 and the valve 6532 are arranged at an angle of, for instance, 45° or 90° relative to the spool 6531. In use, the valve body 6534 is firmly sleeved onto an outer surface of the spool 6531 by bending the flexible strip 6533 to form the valve unit 6532 in a closed position, as shown in FIG. 5B. The valve unit 6532 in the second embodiment can function or work in a similar manner as discussed above with respect to the first embodiment in that a hole in the spool 6531 permits the pressured gas to pass and escape the hole, which then force the valve body 6534 to rotate away from the spool 6531, and renders the valve body 6534 in an open position as shown in FIG. 5A.

In summary, the drink straw 650 is characterized by the one-way valve 651 or the valve unit to permit the pressured gas to escape, thereby to effectively prevent splashing and spilling of the beverage through the drink straw.

The above describes the lid units or assemblies of the present disclosure in detail through the exemplary embodiments for preventing the splash or spill of beverage from the drink straw. It should be understood that the scope of the present disclosure is not limited to the above-mentioned embodiments, but is limited by the accompanying claims. Without departing from the object and spirit of the present disclosure, various modifications to the embodiments are possible, but they remain within the scope of the present disclosure.

What is claimed is:

1. A lid unit for covering a beverage container comprising:
   a lid body having a lid cover and a side wall extending downwardly from the lid cover; and
   a drink straw having a gas relief valve detachably fitted to the lid body,
   wherein the lid cover has a first drink orifice, and a second drink orifice, and
   wherein the first drink orifice and the second drink orifice are spaced apart circumferentially and in fluid communication with the beverage container while being covered by the lid cover.

2. The lid unit of claim 1, further comprising a rotatable top plate mounted on the lid cover.

3. The lid unit of claim 2, wherein when the gas pressure inside the drink straw increases, the gas relief valve opens to permit the pressured gas to pass and escape.

4. The lid unit of claim 2, wherein the rotatable top plate has a V-shaped cutout, and a handle projecting from an upper surface of the rotatable top plate.

5. The lid unit of claim 4, wherein the rotatable top plate is placed on the lid cover with the handle rotatably fitted onto a raised rim of the lid cover.

6. The lid unit of claim 1, wherein the gas relief valve is a one-way valve for releasing the gas inside the drink straw into the lid body, and arranged within the lid body.

7. The lid unit of claim 1, wherein the gas relief valve includes a valve body, a flexible strip, and a spool.

8. The lid unit of claim 7, wherein the spool is arranged relative to the valve body at an angle of between 45° and 90°.

9. The unit of claim 7, wherein the valve body is firmly sleeved onto an outer surface of the spool by bending the flexible strip.

10. The lid unit of claim 7, wherein the flexible strip has a first end fixed to the drink straw, and a second end opposite to the first end.

11. The lid unit of claim 10, wherein the valve body is arranged at the second end of the flexible strip.

12. The lid unit of claim 1, wherein the lid cover has an annular raised rim, and defines a central through hole, the first drink orifice, and the second drink orifice.

13. The lid unit of claim 12, wherein the first drink orifice is shaped and sized to be an elongated slot, and the second drink orifice is shaped and sized to be a circular hole for insertion of the drink straw.

14. The lid unit of claim 12, wherein a top surface of the lid cover includes a recessed portion contiguous to the second drink orifice, and the recessed portion is sized and shaped for accommodating completely a top section of the drinking straw that protrudes beyond the second drink orifice when the top section is folded downward to the lid cover.

15. The lid unit of claim 14, wherein when the second drink orifice is in a fully closed position, the top section of the drinking straw is folded down to lie within the recessed portion by running through and protruding beyond the second drink orifice.

16. The lid unit of claim 12, wherein the first drink orifice and the second drink orifice are sequentially opened by turning a rotatable top plate mounted on the lid cover, allowing for selective dispensing of a beverage from the first drink orifice or the second drink orifice.

17. The lid unit of claim 12, wherein the gas relief valve is arranged beneath the second drink orifice inside the lid body to permit pressured gas to pass through the gas relief valve when gas pressure inside the drink straw increases.

18. The lid unit of claim 12, wherein when the second drink orifice is in a fully open position, the second drink orifice is fully exposed, and the drink straw elastically folds upward to an upstanding position to be in fluid communication with a beverage in the beverage container to allow for dispensing of the beverage therethrough.

19. The lid unit of claim 12, wherein the drink straw has a reduced diameter portion engaged with a protruding portion formed on the inner wall surface of the second drink orifice for mounting the drink straw onto the lid body.

* * * * *